(12) United States Patent  
Burns

(10) Patent No.: US 6,206,620 B1
(45) Date of Patent: Mar. 27, 2001

(54) THREAD CHASING TOOL AND METHOD

(76) Inventor: Brian D. Burns, P.O. Box 70, Kelseyville, CA (US) 95451

( * ) Notice: Subject to any disclaimer, the term of this patent is extended or adjusted under 35 U.S.C. 154(b) by 0 days.

(21) Appl. No.: 09/298,067

(22) Filed: Apr. 22, 1999

Related U.S. Application Data

(60) Provisional application No. 60/082,733, filed on Apr. 22, 1998.

(51) Int. Cl.[7] ..................................................... B23B 51/00
(52) U.S. Cl. ......................... 408/221; 408/215; 408/216; 470/10; 470/185; 470/187
(58) Field of Search ................................ 408/215, 216, 408/221; 470/185, 187, 10

(56) References Cited

U.S. PATENT DOCUMENTS

| | | | |
|---|---|---|---|
| Re. 23,210 | * | 3/1950 | Johnson ................. 408/221 |
| 888,563 | * | 5/1908 | Wilkins ................. 408/221 |
| 1,465,337 | * | 8/1923 | Binford ................. 408/221 |
| 1,488,271 | * | 3/1924 | Miller ................... 408/221 |
| 1,803,888 | * | 5/1931 | Basola et al. .......... 408/221 |
| 2,010,913 | * | 8/1935 | Bruce et al. ........... 408/221 |
| 2,896,495 | * | 7/1959 | Crawford .............. 408/215 |
| 4,572,032 | | 2/1986 | Kinzler . |
| 4,872,790 | | 10/1989 | Sibole . |
| 5,288,181 | | 2/1994 | Pinkston . |
| 5,803,676 | | 9/1998 | Wienss . |

* cited by examiner

*Primary Examiner*—A. L. Wellington
*Assistant Examiner*—Monica S. Carter

(57) ABSTRACT

A pivoting split thread chasing die for rethreading and cleaning damaged or inhibited studs or bolts; and a method of manufacturing the die. The identical main body halves of the pivoting split die, when assembled together with an assembly pin form a pivoting split die with opposing front and rear faces and a hexagonal outside periphery. Threads are formed on the inside periphery of the pivoting split die allowing for engagement with the threads of a stud or bolt. One or more material reliefs are formed on the inside periphery of the pivoting split die to enhance the cleaning and rethreading ability of the pivoting split die threads. These reliefs also serve as points for which debris can escape while performing a rethreading procedure. To rethread or clean a damaged or inhibited bolt or stud, apply an appropriate lubricant to the area to be rethreaded or cleaned. Open up the pivoting split die and install around existing good threads of the stud or bolt and close pivoting split die until minimal closure gap exists. Select the appropriate wrenching tool and work the pivoting split die back and forth (counter-clockwise and clockwise) over the damaged or inhibited threads until the pivoting split die begins to move about the threads freely.

7 Claims, 3 Drawing Sheets

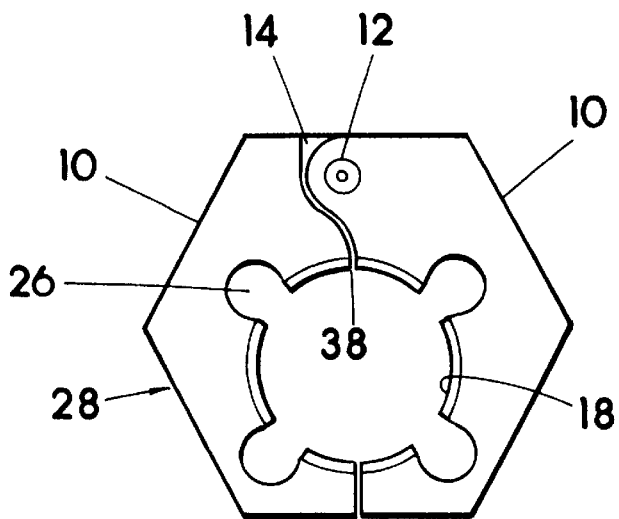
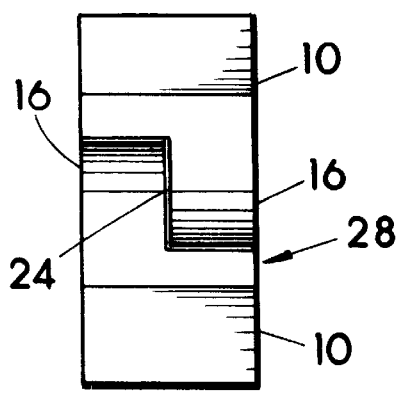
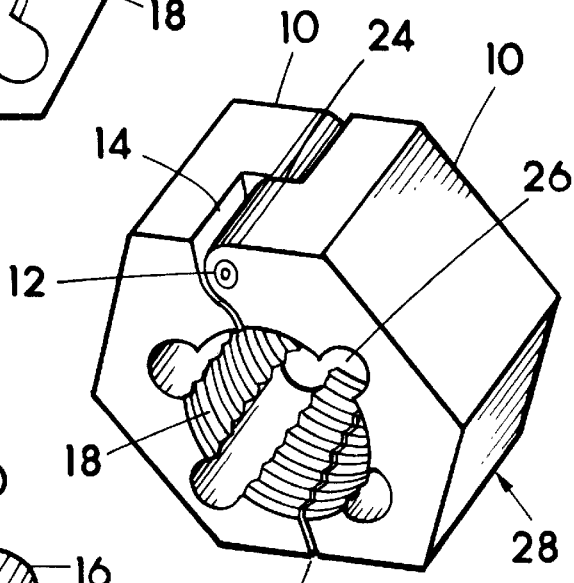
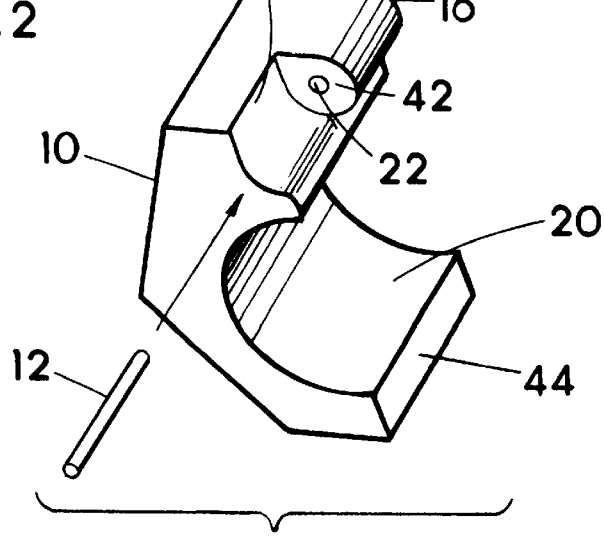

THREAD CHASING TOOL AND METHOD

A priority claim is hereby made to my pending U.S. Provisional application number 60/082,733 filed Apr. 22, 1998.

BACKGROUND OF THE INVENTION

1. Field of the Invention

The present invention pertains to a pivoting die for the cleaning, rethreading or chasing of threads on studs or bolts that have been damaged, rusted or inhibited with paint or other foreign matter build up.

2. Description of the Prior Art

A common method or technique currently in use for retreading or cleaning of studs, bolts is with the use of a hexagonal rethreading die. A common rethreading die has a defined entry leading into a central opening having threaded surfaces facing into the opening for thread forming or cutting. Strategically located around the opening are relief areas to permit cuttings or other foreign matter to fall away from the affected areas of the stud or bolt. A very common problem with this oft used rethreading die, is that of starting the die over damaged threads on the end of a stud or bolt. In most cases, damage to threads occurs at or near the unattached end of a stud making it difficult to engage a rethreading die with proper alignment to the thread pitch of the stud. This usually results in what is commonly called "cross threading". On all-thread rods there are typically no open or free ends with which to attach a common rethreading die. In this situation a thread file is typically used. Depending on the amount of damaged or inhibited area this process could be very lengthy and laborious. Expensive or hard to find bolts create similar problems and are often just discarded. Hand reworking methods are often unsuccessful because of the critical nature of thread pitch and diameters. U.S. Pat. No. 4,572,032 issued to Kinzler Feb. 25, 1986 describes a conventional die modified to perform as a hinged rethreading die for primary use on in situ studs. However, this modification process is not simple nor is it effective. A conventional die is described as being sectioned into halves, with a machined slot at the top end to accept a multi-pin hinge device and an adjustment screw at the bottom end or closure point for fine adjustments. On few existing hexagonal rethreading dies, this process of modification can work in configuration only and seldom in function. Outer hexagonal wall thicknesses lessen with each increasing size in a conventional rethreading die set making it nearly impossible to accomplish this type of hinge modification. The overall manufacturing process associated with this die would be extremely costly making it relatively unaffordable. Also, with adjustments necessary for proper cutting of threads, using this type of a rethreading die in tight spaces becomes tedious. It is also noted that movement of the Kinzler die is in an outwardly fashion, which would necessitate reattaching or turning over of the die to make further passes over the damaged thread area.

U.S. Pat. No. 5,288,181 to Pinkston issued Feb. 22, 1994 describes a complicated and cumbersome tool for reconditioning and rethreading a stud made up of moveable jaws activated by a cam device. Provided this tool were to be effective, each partial rotation on a threaded stud would have to be accommodated by adjusting unspecified tension to a threaded collar above the moveable jaws creating imprecision and irregularity in the process.

U.S. Pat. No. 4,872,790 to Sibole issued Oct. 10, 1989 describes a rethreading die segmented into a plurality of sections held together by a tension spring. A segmented die is passed over a threaded member and re-engaged on the threads. An extremely difficult tool to use in tight areas requiring both hands to engage with risk of losing one or more segmented parts of the die with the dislodging of the tension spring. Proper meshing of the member threads and the die threads would be very difficult in areas of inhibited view.

U.S. Pat. No. 5,803,676 to Wienss issued Sep. 8, 1998 shows a single directional tapered and keyed device for drawing over damaged threads with the use of a driver. A complicated, inefficient method not allowing for bidirectional passage over inhibited threads or effective use in areas where clearance is of concern.

SUMMARY OF THE INVENTION

The present invention pertains to a pivoting split die for the cleaning, rethreading or chasing of threads on studs or bolts that have been damaged, rusted or inhibited with paint or other foreign matter build up. The present invention provides novel tooling for, and an improved method of rethreading, chasing and cleaning damaged or inhibited threads on studs or bolts and an improved method of manufacturing the rethreading die. The present invention is extremely simple to use. In situations where threads on a mounting stud or bolt have been damaged, cross-threaded, or inhibited with foreign matter, the present invention provides an easy alternative to standard rethreading or cutting dies. Apply an appropriate lubricant to the bolt or stud. Open up the pivoting die and locate around remaining good threads of bolt or stud. Secure the die with wrenching means and work back and forth over the inhibited threads until the die is completely free from the bolt or stud. The present invention has a nominal tolerance manufactured into the die so as to not require an adjustment in the closure gap of the die when applied to the stud or bolt. Since the present invention is not a new thread cutting device, typical cutting die or rethreading die adjustments are not necessary. The purpose of the present invention is to provide rejuvenation and cleaning of existing threads in order to accommodate a new nut or fastener to the stud or bolt or to aide in the removal of a nut or fastener by cleaning the threads. The present invention requires very little effort to operate effectively. Since no adjustment is necessary when using the present invention, very little time is needed to accomplish a rethreading or cleaning task. The present invention snaps closed around undamaged threads with fingertip pressure. Once closed and engaged with the threads of the stud or bolt any appropriate wrenching tool can be used effectively to perform the task. The present invention is bidirectional meaning there is no preferred position such as up or down.

The present invention is manufactured of simple methods. There is no requirement to modify existing conventional dies. This is costly and ineffective. The present invention requires only two opposing halves of identical configuration. When the two opposing halves are mated, a through hole is drilled for a pivot pin, a pivot pin is installed and thread surfaces and reliefs are formed with the two opposing halves closed. Forming the reliefs and thread surfaces with the two opposing halves in the closed position ensures the consistent placement and effectiveness of the rethreading surfaces once enmeshed with the threads of a stud or bolt. The thread surfaces and reliefs are formed of standard machining methods.

BRIEF DESCRIPTION OF DRAWINGS

FIG. 1 shows a front elevational view of a pivoting split die in the closed position.

FIG. 2 shows a top elevational view of a pivoting split die in the closed position.

FIG. 3 shows a perspective view of a pivoting split die in the closed position.

FIG. 4 shows a perspective view of a blank half or a member of a pivoting split die prior to assembly and application of threads and reliefs.

BEST MODES FOR CARRYING OUT THE INVENTION

Figure 5:
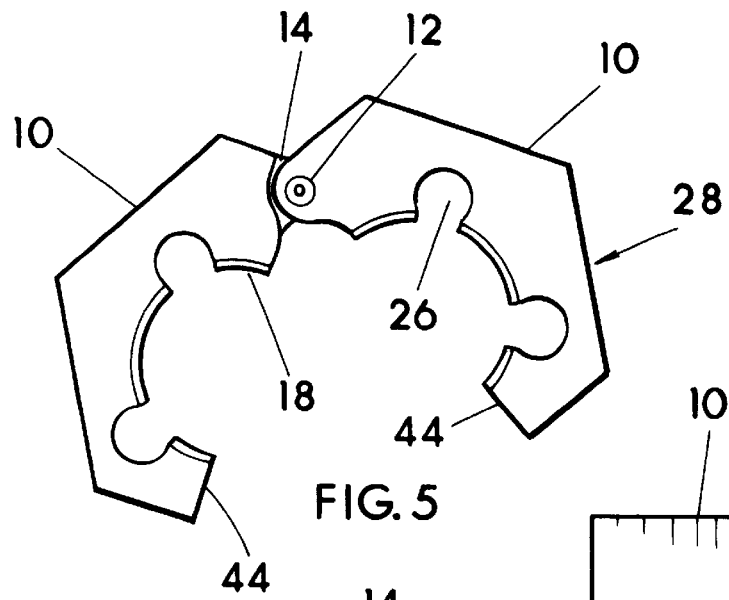
FIG. 5 shows a front elevational view of a pivoting split die in the open position.
Figure 6:
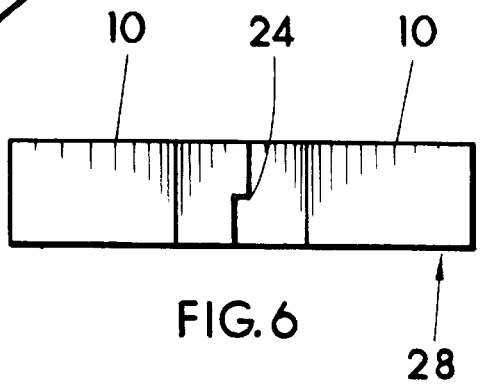
FIG. 6 shows a top elevational view of a pivoting split die in the open position.

Referring now to FIGS. 1–8, the pivoting split die 28 comprises a pair of opposing and identical main body members or halves 10 each made of a rigid strong metal material. Each main body half 10 being identical to the other allows for a substantially lower cost of manufacturing of die 28 compared to if the halves were not identical, and this due to reduced tooling to be made (one cavity or die stamp or the like needed) and less possible confusion in that there are not any left and right halves to keep track of and mated or matable in the manufacturing of die 28. The body halves 10 when flipped or opposed relative to one another and assembled together define the pivoting split die 28 in general. The "flipped" position may be seen in FIG. 2, and also from examining FIGS. 3–4, 6, wherein the ears 16 are cooperatively mated and the terminal ends 44 are adjacent one another. The pivoting split die 28 may be said to have a front face and an oppositely disposed back face, also identical to the front face. The terms "front face" and "back face" are used here as a convenient method of definition only, so as to adequately describe the construction of the pivoting split die 28. FIG. 1 shows either the front or back face of pivoting split die 28. The outside periphery configuration of the pivoting split die 28 after assembly of the two halves is preferably of hexagonal or the like configuration providing multiple flat surfaces for engagement with a wrenching tool, preferably at least one flat exterior surface is provided by each of the body halves 10 so that a gripping or wrenching tool engages each of the body halves simultaneously when the die 28 is closed and in such a position, i.e., the flat surfaces of the die 28 positioned relative to one another and suitable engagement surfaces of a suitable gripping or wrenching tool that the die 28 is retained in a closed position as will become increasing appreciated with continued reading.

Figure 7:
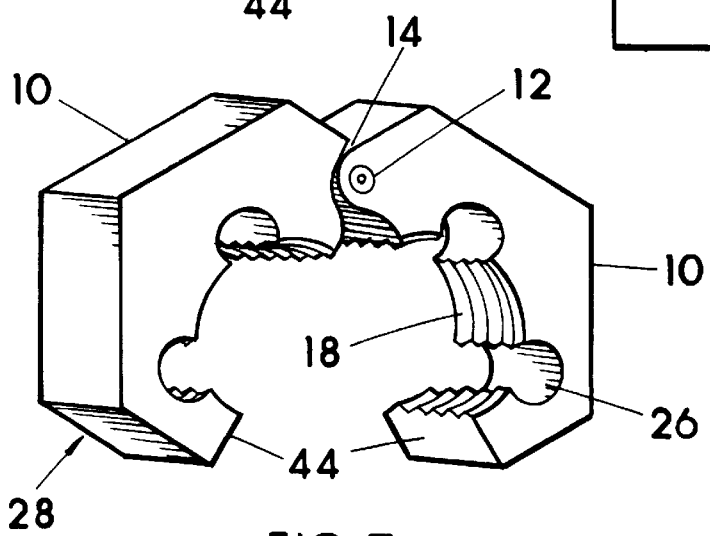
FIG. 7 shows a perspective view of a pivoting split die in the open position.
Figure 8:
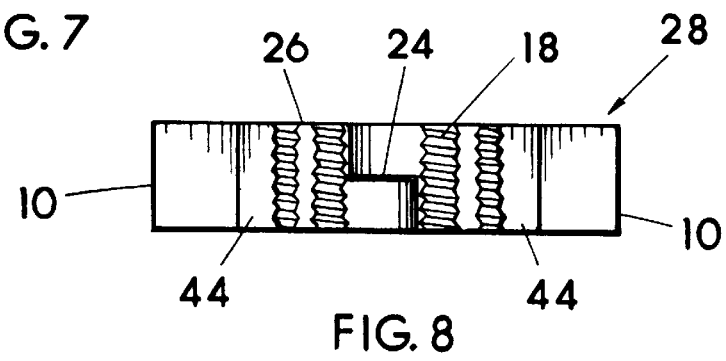
FIG. 8 shows a bottom elevational view of a pivoting split die in the open position.

Assembling main body halves 10 by installing assembly pin 12 through the assembly pin through holes 22 of pivot pin ears 16 as shown in FIG. 4 and staking in place, form the pivoting split die 28 as shown in FIG. 1 and FIG. 3, at this point without threads as shown in FIG. 4. The main body halves 10 are each fabricated with a semi-circle 20 as shown in FIG. 4 across from the one or more of the exterior flat surfaces. Ear 16, one on each of the main body halves 10 can be considered a portion of the body half 10, and is a half thickness further extending portion or member of the main portion of the body halve 10. Ear 16 has an outer surface or area 40 flush or continuous of the front or back face of the main portion of the body half 10 (or die 28) and an inner surface 42, a flat planar surface oppositely disposed or across from the outer surface 40. Each of the two identical body halves 10 includes an abutment end 44 as shown in FIGS. 5 and 7. Ends 44 are at the opposite ends of halves 10 from ears 16 so as to be straight across and on-center of the pivot or pivotal axis, and the ends 44 when closely adjacent one another with the die 28 closed define closure gap 38.

Pivoting split die 28 is assembled by joining the main body halves 10 together with inside surface 42 of ears 16 engaged against one another, or in other words with the identical halves 10 flipped relative to one another. Each identical ear 16 includes a single hole 22 extending therethrough from outer surface 40 through inner surface 42. Hole 22 can be and is preferably of a single diameter. The identicality of body halves 10, ears 16 and holes 22 allows the proper and ready application of pivot pin 12, and provides for the use or need of just a single pivot point or pivot pin 12 to support or maintain the two halves 10 properly mated with the die 28 opened or closed as can be seen in FIGS. 1–3 and 5–9.

Figure 9:
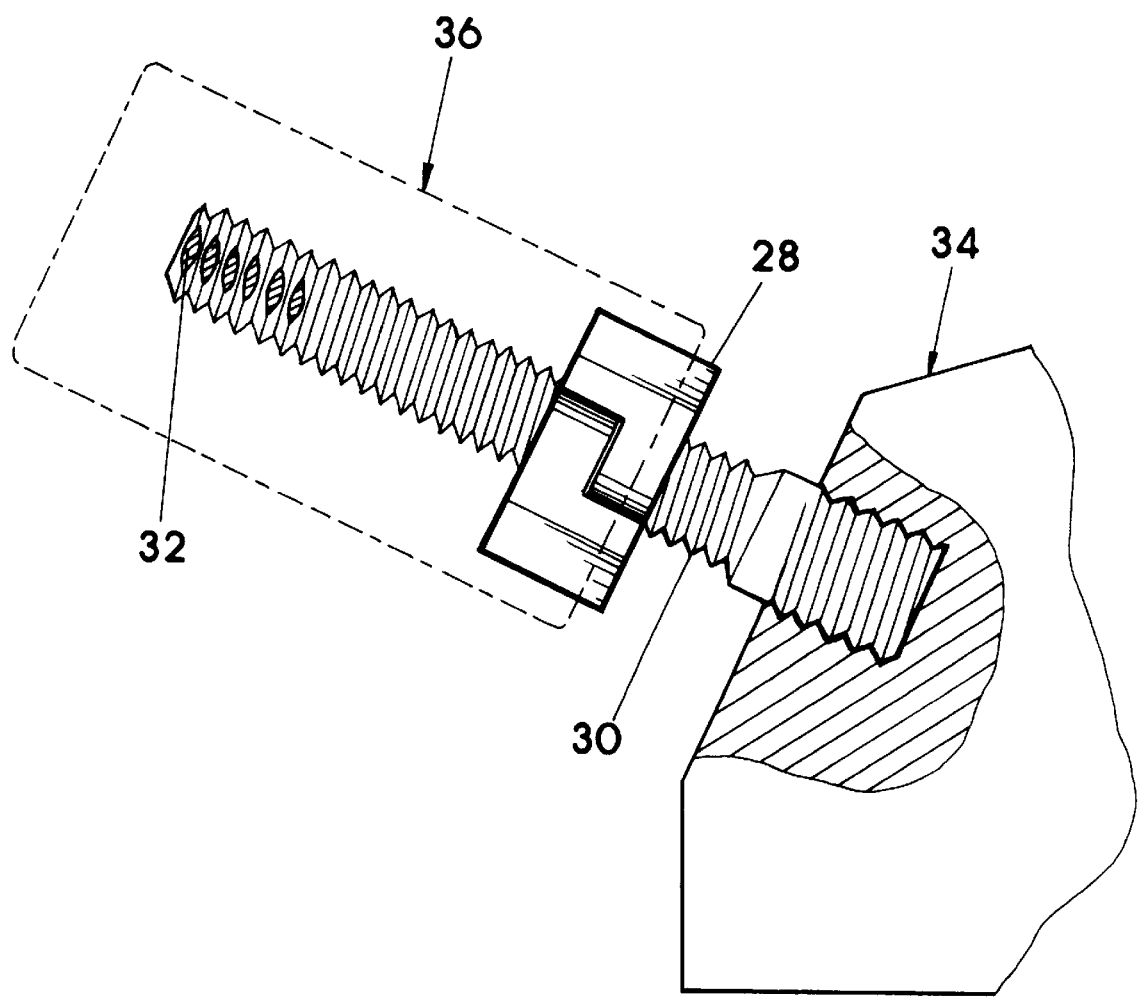
FIG. 9 shows a side elevational view of a pivoting split die adapted to a typical stud having damaged threads near the free end of the stud.

When pivoting split die 28 is assembled by joining the main body halves 13 and by installing assembly pin 12 the opposing semi-circles 20 form a circular bore on the inside periphery of the pivoting split die 28 when the main body halves 10 are in the closed position as shown in FIG. 1. When closed, the pivoting split die 28 has a variable width closure gap 38 to allow for proper alignment and thread mesh between the pivoting split die 28 threads 18 and the threads of a stud or bolt or any other threaded member as shown in FIG. 9. Closure gap 38 being defined between ends 44 can be in effect closed by abutment of ends 44, or can be opened in various amounts depending upon threads dimensions, defects or inhibitors, the halves 10 having pivoted relative to one another at pin 12.

The opening and closing of the pivoting split die 28 is accommodated by the opposing radiuses of the pivot pin ears 16 fabricated into the main body halves 10 at the top or pivoting ends, forming a pivot gap 14. The full thickness of the pivoting split die 28 from the front face to the back face, which is the full thickness of the halves 10, is X. The thickness of each pivot pin ear 16 is one half of X. Although the assembly pin 12 is fixedly located in place by slight flaring of the oppositely disposed terminal ends thereof after insertion of pin 12 through hole 22 of the pivot pin ears 16, the cylindrical configuration of the assembly pin 12 and the cylindrical configuration of the assembly pin through hole 22 allows for ease of movement during opening and closing of the pivoting split die 28. The circular threaded bore formed by the main body halves 10 is on a center axis as shown in FIG. 5 but can be offset from a center axis in the direction of the closure gap 38 as shown in FIG. 1 for applications wherein full rotation of the threading die 28 is not possible but back and forth rotation would be possible if the threaded central bore was offset to provide a sufficiently thin wall area of the die 28 adjacent gap 38 to allow application of the die 28 to the threaded member in need of thread chasing, e.g. stud or bolt. Since, if one is unable to locate die 28 about the threads of a stud or bolt in need of thread chasing, and this due to the threaded central bore being central as shown in FIG. 5, then the ability to apply a die 28 with offset threaded bore as shown in FIG. 1 and discussed above can be viewed as critically important.

When assembled prior to the fabrication of the threads 18 and material reliefs 26 the pivoting split die 28 is held in the closed position and alignment of the main body halves 10 is assured by appropriate tooling methods in preparation to receive the formation of threads 18 and material reliefs 26. The appropriate tooling methods utilized during this operation assures that proper alignment of the threads 18 and reliefs 26 and the main body halves 10 are maintained during and after the formation of the threads 18 and reliefs 26. The threads 18 and reliefs 26 are formed of standard tooling and methods, i.e., rotating cutting tools, and are formed from the front face of the pivoting split die 28 to the back face of the pivoting split die 28. Likewise, the formation of the threads 18 and reliefs 26 can be formed of standard tooling and methods from the back face to the front face of the pivoting split die 28 as shown in FIGS. 1 and 3. Once threads 18 are formed on the inside periphery of the pivoting split die 28 the reliefs 26 are formed at various locations of equal or near equal spacing so as not to remove threads from closure gap 38 points as shown in FIGS. 1 and 5. Allowing more material to remain at the closure gaps 38 provides for a sturdier pivot pin 12. The closure gaps 38 can be said to be directly down the middle of the pivoting split die 28 when pivoting split die 28 is in the closed position as shown in FIG. 1. The pivoting split die 28 will accept any gripping tool 36 of adequate size e.g. socket wrench as shown in FIG. 9.

Referring now to FIG. 9, the pivoting split die 28 when applied just below the damaged or inhibited threads 32 as show in FIG. 9 or just above the damaged or inhibited threads 32 utilizes the good remaining threads of a stud or bolt as a guide to assure proper alignment of threads when rethreading or cleaning. A typical stud 30 when embedded into and protruding from an object e.g. engine block 34 is a typical situation where removal of a stud 30 could be costly or rethreading in place with a common rethreading die could be laborious. Once pivoting split die 28 is applied to the stud 30 a wrenching tool 36 is attached firmly and the pivoting split die 28 is rotated clockwise and counter-clockwise over the damaged or inhibited threads 32 until threads are good enough to accommodate a new fastener.

From the above it can be appreciated that the invention, at least from one viewpoint is or includes a method of manufacturing which can be recited as follows:

A method of manufacturing a thread chasing tool or die 28 comprising the steps of:

a) defining a first body half 10 having an endwardly positioned integral ear 16 portion; a hole 22 through the ear portion 16; a semi-circular surface 20, and a terminal end 44 opposite from the ear 16 portion;

b) defining a second body half 10 substantially identical to said first body half 10;

c) locating the first and second body halves 10 in flipped relationship to one another with inside surfaces 42 of the ear 16 portions engaged with one another; holes 22 aligned with one another, the semi-circular surfaces 20 opposing one another and defining a central bore;

d) connecting the two halves 10 to one another by installing a pivot pin 12 through the aligned holes 22;

e) defining threads 18 on the semi-circular surfaces 20, the threads 18 are preferably applied with the terminal ends 44 of the body halves 10 in close adjacency (abutted) to one another. The method of manufacturing further includes the step of defining at least one material relief 26 in each of the semi-circular surfaces 20. The method of manufacturing can of course, within reason, include the steps applied in different order than above recited, and may include fewer or additional steps to those specified.

Although I have very specifically described the preferred structures and best modes of the invention, it should be understood that the specific details are given for example to those skilled in the art and are not intended to strictly limit the scope of the invention. Changes in the specific structures and steps described can be made without departing from the scope of the invention, and therefore the scope of the invention is to be determined by the spirit and scope of the appended claims.

I claim:

1. A thread chasing tool comprising:

a split nut defined by two substantially identical halves in flipped relationship and connected to one another at extending ears of the halves with a single pivot pin through the ears so as to allow said split nut to be movable between an open position and a closed position; each of said substantially identical halves having a semi-circular surface for defining a central bore with said split nut in the closed position; threads defined on the semi-circular surfaces;

material relief means positioned within said central bore for allowing material removed from threads of a threaded member to relocate;

each of the halves including a terminal end across from the ears, the terminal ends positioned in close adjacency with one another when said split nut is in the closed position and defining a closure gap positioned away from said material relief means.

2. A thread chasing tool according to claim 1 further including at least one exterior surface on each of said halves suitable for engagement by a portion of a wrenching tool.

3. A thread chasing tool according to claim 2 wherein said at least one exterior surface on each of said halves is a flat surface.

4. A thread chasing tool according to claim 3 wherein said split nut has a hexagonal exterior periphery.

5. A thread chasing tool according to claim 3 wherein the halves each have a full thickness of X, and the ear thickness is one-half of X.

6. A method of manufacturing a thread chasing tool comprising the steps of:

a) defining a first body half having an endwardly positioned integral ear portion; a hole through the ear portion; a semi-circular surface, and a terminal end opposite from the ear portion;

b) defining a second body half having an endwardly positioned integral ear portion, a hole through the ear portion, a semi-circular surface, and a terminal end opposite from the ear portion, wherein said second body half is substantially identical to said first body half;

c) locating the first and second body halves in flipped relationship to one another with inside surfaces of the ear portions engaged with one another; holes aligned with one another, the semi-circular surfaces opposing one another and defining a central bore, and with the terminal ends adjacent one another defining a closure gap;

d) connecting the two halves to one another by installing a pivot pin through the aligned holes;

e) defining at least one material relief in each of the semi-circular surfaces with the material reliefs positioned away from said closure gap;

f) defining threads on the semi-circular surfaces.

7. A method of manufacturing a thread chasing tool according to claim 6 wherein the threads are applied with the terminal ends of the body halves in close adjacency to one another.

* * * * *